J. E. SYMONS.
SINGLE SHAFT DISKS.
APPLICATION FILED OCT. 9, 1911.
1,083,229.
Patented Dec. 30, 1913.
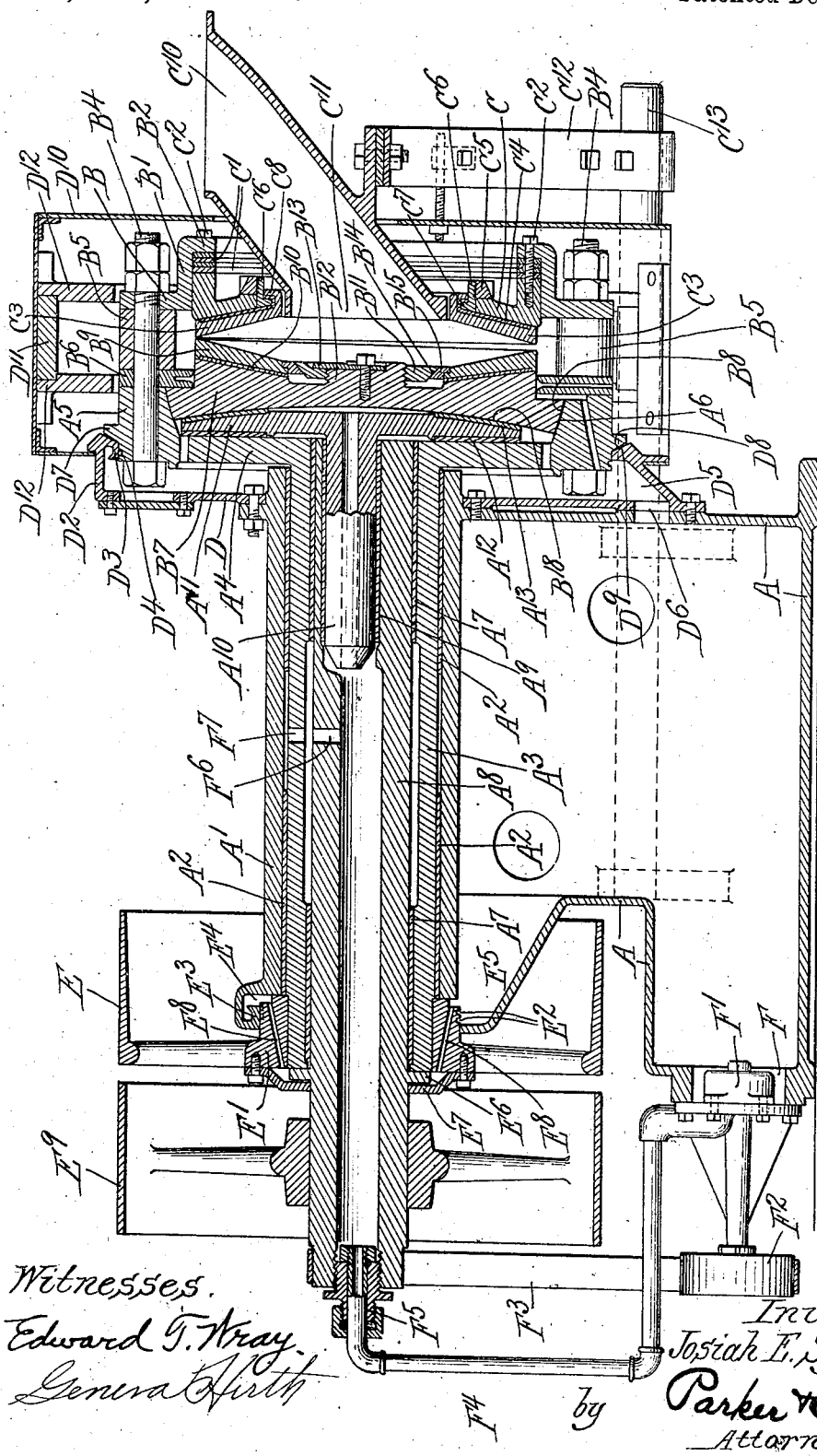

UNITED STATES PATENT OFFICE.

JOSIAH E. SYMONS, OF MILWAUKEE, WISCONSIN, ASSIGNOR TO SYMONS BROTHERS COMPANY, OF MILWAUKEE, WISCONSIN, A CORPORATION OF SOUTH DAKOTA.

SINGLE-SHAFT DISKS.

1,083,229.

Specification of Letters Patent.  Patented Dec. 30, 1913.

Application filed October 9, 1911. Serial No. 653,502.

*To all whom it may concern:*

Be it known that I, JOSIAH E. SYMONS, a citizen of the United States, residing at Milwaukee, in the county of Milwaukee and State of Wisconsin, have invented a certain new and useful Improvement in Single-Shaft Disks, of which the following is a specification.

My invention relates to improvements in crushing machines and is illustrated diagrammatically in one form in the accompanying drawings, wherein is shown a longitudinal section through my machine.

Like parts are indicated by like letters in each of the figures.

The hollow base A carries the cylindrical bearing sleeve $A^1$ in which are disposed adjacent either end the bearing surfaces $A^2$. The cylindrical hollow shaft $A^3$ is rotatably mounted within said bearing surfaces and carries on one end the flange $A^4$ from which projects outwardly the cylindrical collar $A^5$ having the inwardly disposed spherical bearing surface $A^6$. The shaft $A^3$ has adjacent either end the bearing surfaces $A^7$ which support the rotating sleeve $A^8$, which is provided at one end with the eccentric pocket $A^9$ in which is rotatably mounted the pin $A^{10}$ projecting centrally from the cam disk $A^{11}$, which has on one side the flat bearing surface $A^{12}$ in opposition to the flange $A^4$ and on the other side the spherical bearing surface $A^{13}$.

The ring B which is provided with the upwardly projecting cylindrical collar $B^1$ from which projects inwardly the flange $B^2$ is held in position with respect to the collar $A^5$ by the bolts $B^4$ which are surrounded by the spacing and wearing collars $B^5$ and which pass through and hold in position on the collar $A^5$ the annular guard ring $B^6$. The supporting disk $B^7$ is provided with a spherical surface $B^8$ concentric with and in opposition to the spherical surface $A^6$ on the collar $A^5$ and is provided with the spherical surface $B^{18}$ concentric with and in opposition to the spherical bearing surface $A^{13}$ on the cam disk $A^{11}$, and carries on its other side the disk-shaped crushing plate $B^9$ spaced therefrom by the zinc backing $B^{10}$ and held in position by the nut $B^{11}$ screw-threaded upon the boss $B^{12}$, which is locked against rotation by the bar $B^{13}$ and has the conical surface $B^{14}$ in opposition to the holding collar $B^{15}$ in the crushing plate $B^9$.

The ring C is slidably mounted within the cylindrical member $B^1$, spaced from the flange $B^2$ by the shims $C^1$, held in position by the bolts $C^2$, and supports the dish-shaped crushing plate $C^3$ spaced therefrom by the zinc backing $C^4$. The nut $C^5$ engaging the collar $C^6$ cut in halves, which collar is provided with the inwardly extending flange $C^7$ to engage the outwardly extending flange $C^8$ on the back of the crushing plate, holds the plate firmly against the zinc backing $C^4$. The tubular chute $C^{10}$ which is provided with the discharge mouth $C^{11}$ concentric with and passing through the crushing plate $C^3$ is supported upon the frame $C^{12}$ slidably mounted upon the shafts $C^{13}$ projecting horizontally out from the front of the base A.

The circular plate D which is substantially concentric with the bearing sleeve $A^1$ is rigidly attached to the base A and sleeve $A^1$ and is provided with the outwardly projecting cylindrical wall $D^2$ having the inwardly and rearwardly projecting L shaped flange $D^3$ in opposition to the annular grooves $D^4$ in the periphery of the flange $A^4$. The discharge pocket $D^5$ located at the lowest point of the disk communicates by means of the passage $D^6$ through the disk D and wall of the base A to the interior of the base. The collar $A^5$ is provided with the outwardly projecting flange $D^7$ having the curved surface $D^8$ in opposition to a curved surface $D^9$ on the collar $D^2$. The hood $D^{10}$ is rotatably mounted upon the shafts $C^{13}$ inclosing the outer edge of the collar $D^2$ and is provided with the annularly arranged bearing surfaces $D^{11}$ surrounding the crushing disks and held in position by the annularly arranged guide and baffle members $D^{12}$ bolted to the hood.

The shaft $A^3$ carries at its end removed from the crushing members the driving pulley E having the hub $E^1$, the inward-extending portion of which is provided with the annular grooves $E^2$ in opposition to the L shaped flange $E^3$ on the sleeve $A^1$. The flange $E^3$ forms with the sleeve $A^1$ and hub $E^1$ an L shaped oil receiving chamber $E^4$ which discharges at its lowest point through the passage way $E^5$ into the interior of the base A. The rotating sleeve $A^8$ is provided, in opposition to the end of the shaft $A^3$ with the rigid integral collar $E^6$ which collar is overhung by the removable annular ring $E^7$ carried by the hub $E^1$ but out of contact with the collar $E^6$. The passages $E^8$ lead from the space between the collar $E^6$ and ring $E^7$ through the hub $E^1$ and discharge into the L shaped passage $E^4$. The pulley $E^9$ is rigidly attached to the outer end of the rotating sleeve $A^8$.

The hollow base A is provided at its bottom with the discharge passage F which leads to the oil pump $F^1$ which pump is driven by the pulley $F^2$ and belt $F^3$ from the sleeve $A^8$ and discharge by means of the piping $F^4$ through the packing box $F^5$ into the hollow interior of the rotating sleeve $A^8$. The passage way $F^6$ leads radially through the rotating sleeve $A^8$ and discharges into the space between the rotating sleeve $A^8$ and the hollow shaft $A^3$ and the passage way $F^7$ leads through the sleeve $A^8$ and shaft $A^3$ to the space between the shaft $A^3$ and the sleeve $A^1$.

Broadly speaking the construction which is here presented as one illustration of my invention embraces a frame, a long bearing therein, a hollow shaft rotating in said bearing and driven in one direction and carrying a hollow head in which are mounted the two crushing disks one fixedly and the other so as to float or be loose in the head but to be carried therewith. In addition to these parts I have an inner sleeve with means for driving it in the opposite direction and a wedging device which consists of a cam disk with a pin eccentrically mounted in the end of the sleeve. This cam disk working back and forth under the floating crushing disk progressively tilts it in a direction opposite to its direction of rotation.

It will be evident that while I have shown in my drawings an operative device still many changes might be made in size, shape and arrangement of parts without departing materially from the spirit of my invention and I wish therefore, that my drawings be regarded as in a sense diagrammatic.

The use and operation of my invention is as follows: The two driving pulleys are driven by belts traveling in opposite directions. The material to be crushed is fed in through the feed chute into the crushing chamber formed between the two disk-shaped crushing members which are disposed within the hollow rotating head. The rotation of the single shaft which carries the head and hence the two crushing disks, causes the material to be fed by centrifugal force outward toward the periphery of these disks and causes it to become tightly wedged in the narrow space between them. The rotation of the sleeve in the opposite direction operates the eccentric and causes the cam disk which has the spherical surface to gyrate about the axis of rotation of the crushing disk. In whatever position this flange or head is found it will be such that the disks will be tilted with reference to each other. The part of the peripheries adjacent the axis of the flange will be closer together than the part of the peripheries farther removed therefrom. As this flange or cam disk gyrates about the axis of rotation of the crushing disks this point of approach constantly travels forward in a direction opposite to the direction of motion of the crushing disks. This will result in pinching the material between the two disks at the point at which they approach and in releasing the pinched material and allowing it to be acted upon by the centrifugal force to pass farther out toward the periphery of the disks as they recede. This pinching and subsequent receding of the disks will permit the material to be fed out from between them as it decreases in size and it will therefore pass through the machine under the influence of centrifugal force and be discharged violently in a more or less tangential direction where it will be caught by the hood and discharged through the discharge spout. By thus causing the point of nearest approach of the crushing disk to travel forward in the direction opposite to the direction of rotation of the crushing disks the rotational speed of the latter can be greatly reduced with reference to the number of such pinching or crushing effects, in other words, in order to get 600 pinching effects per minute without this forward travel of the point of nearest approach the two disks would have to make 600 revolutions per minute. By the arrangement for advancing the point of closest approach we may obtain 600 pinching effects per minute by driving the crushing disks at the rate of 200 revolutions per minute and advancing the point of nearest approach at the rate of 400 revolutions per minute. These proportions can of course, be varied at will. The result is a feed strong enough and not too strong to throw the material too violently out from between the disks and a greatly reduced friction of the bearings. The tilting of one crushing disk with reference to the other and the advancing of the point of nearest approach are both accomplished by means of the one device, that is, the gyrating cam disk. Of course the form and shape of this device can be greatly altered, the essential point being that with the single device of this nature moving laterally so as to tilt the disks and advance the pinching point the desired object can be accomplished. The disk tilting device performs two functions. It tilts the disk progressively, that is, it causes the point of nearest approach of the disks to travel. If the sleeve which carries the eccentric pin ceases to rotate then the tilting disk will still perform its function of tilting the disks and causing the point of nearest approach to progressively advance as the crushing disks rotate in the same direction. If, however, as above explained, the operator desires to avail himself of the two functions of the tilting disk, he may start the sleeve rotating in the direction opposite to the rotation of the crushing disks whereupon as above explained, this point of nearest approach will be progressively advanced in the direction opposite to the direction of rotation of the crushing disks.

By the term tilting as applied to the movement of the disk or floating member, I mean, of course, to refer to that movement of the disk whereby it is manipulated so as to effect the crushing action as described.

I claim:

1. In a disk crusher the combination of a frame with a shaft mounted thereon a hollow head carried by said shaft two opposed crushing disks in the head rotated thereby in the same direction one fixed and the other floating and interposed between the floating disk and the head a tilting device adapted to progressively tilt the floating disk.

2. In a disk crusher the combination of a frame with a shaft mounted thereon a hollow head carried by said shaft two opposed crushing disks in the head rotated thereby in the same direction one fixed and the other floating and interposed between the floating disk and the head a tilting device adapted to progressively tilt the floating disk in a direction opposite to the direction of rotation of the crushing disks.

3. In a disk crusher the combination of a frame with a shaft mounted thereon a hollow head carried by said shaft two opposed crushing disks in the head rotated thereby in the same direction one fixed and the other floating and a tilting disk interposed between the floating disk and the head and adapted to progressively tilt the floating disk.

4. In a disk crusher the combination of a frame with a shaft mounted thereon a hollow head carried by said shaft two opposed crushing disks in the head rotated thereby in the same direction one fixed and the other floating and a tilting disk interposed between the floating disk and the head and adapted to progressively tilt the floating disk in a direction opposite to the direction of rotation of the crushing disks.

5. In a disk crusher the combination of a frame with a shaft mounted thereon a hollow head carried by said shaft two opposed crushing disks in the head rotated thereby in the same direction one fixed and the other floating and a tilting device interposed between the floating disk and the head and means for rotating it so as to progressively tilt the floating crushing disk.

6. In a disk crusher the combination of a frame with a shaft mounted thereon a hollow head carried by said shaft two opposed crushing disks in the head rotated thereby in the same direction one fixed and the other floating and a tilting device interposed between the floating disk and the head and means for rotating it so as to progressively tilt the floating crushing disk in a direction opposite to the direction of rotation of the crushing disks.

7. In a disk crusher the combination of a frame with a shaft mounted thereon a hollow head carried by said shaft two opposed crushing disks in the head rotated thereby in the same direction one fixed and the other floating and a tilting disk interposed between the floating disk and the head and means for rotating it so as to progressively tilt the floating disk said tilting and floating disks provided with engaging spherical surfaces.

8. In a disk crusher the combination of a frame with a shaft mounted thereon a hollow head carried by said shaft two opposed crushing disks in the head rotated thereby in the same direction one fixed and the other floating and a tilting disk interposed between the floating disk and the head and means for rotating it so as to progressively tilt the floating disk in a direction opposite to the direction of rotation of the crushing disks said tilting and floating disks provided with engaging spherical surfaces.

9. In a disk crusher the combination of a frame with a hollow shaft mounted thereon a hollow head carried by said shaft two opposed crushing disks in the head rotated thereby in the same direction one fixed and the other floating and interposed between the floating disk and the head a tilting device adapted to progressively tilt the floating disk.

10. In a disk crusher the combination of a frame with a hollow shaft mounted thereon a hollow head carried by said shaft two opposed crushing disks in the head rotated thereby in the same direction one fixed and the other floating and interposed between the floating disk and the head a tilting device adapted to progressively tilt the floating disk in a direction opposite to the direction of rotation of the crushing disks.

11. In a disk crusher the combination of a frame with a hollow shaft mounted thereon a hollow head carried by said shaft two opposed crushing disks in the head rotated thereby in the same direction one fixed and the other floating a tilting device interposed between the floating disk and the head and a support on which it is mounted eccentrically with reference to the axis of the rotating shaft.

12. In a disk crusher the combination of a frame with a hollow shaft mounted thereon a hollow head carried by said shaft two opposed crushing disks in the head rotated thereby in the same direction one fixed and the other floating a tilting device interposed between the floating disk and the head and a support on which it is mounted eccentrically with reference to the axis of the rotating shaft and means for rotating said support in a direction opposite to the direction of rotation of the shaft.

13. In a disk crusher the combination of a frame with a hollow shaft mounted thereon a hollow head carried by said shaft two opposed crushing disks in the head rotated thereby in the same direction one fixed and the other floating a hollow sleeve in the hollow shaft means for rotating it in a direction opposite to that of the shaft an eccentric opening in the sleeve a tilting disk interposed between the floating disk and the head and a pin on said disk received into the eccentric opening in the sleeve.

14. In a disk crusher the combination of a frame with a shaft mounted thereon a hollow head carried by said shaft two opposed crushing disks in the head rotated thereby in the same direction one fixed and the other floating and a tilting disk interposed between the floating disk and the head and adapted to progressively tilt the floating disk the edge of said floating disk and the inner surface of the head provided with opposed engaging surfaces forming parts of the surface of concentric spheres.

15. In a disk crusher the combination of a frame with a shaft mounted thereon a hollow head carried by said shaft two opposed crushing disks in the head rotated thereby in the same direction one fixed and the other floating and a tilting disk interposed between the floating disk and the head and adapted to progressively tilt the floating disk in a direction opposite to the direction of rotation of the crushing disks the edge of said floating disk and the inner surface of the head provided with opposed engaging surfaces forming parts of the surface of concentric spheres.

16. In a disk crusher the combination of a frame with a shaft mounted thereon a hollow head carried by said shaft two opposed crushing disks in the head rotated thereby in the same direction one fixed and the other floating and a tilting disk interposed between the floating disk and the head and adapted to progressively tilt the floating disk in a direction opposite to the direction of rotation of the crushing disks the opposed surfaces of the floating disk and the tilting disk forming parts of the surface of concentric spheres.

17. In a disk crusher the combination of a frame with a shaft mounted thereon a hollow head carried by said shaft two opposed crushing disks in the head rotated thereby in the same direction one fixed and the other floating and interposed between the floating disk and the head a tilting device adapted to progressively tilt the floating disk and an inwardly projecting ring within the head in close proximity to the floating disk.

18. A crushing machine comprising a frame, two opposed rotating crushing disks inclined one to the other, a driving shaft upon which they are both supported, means for tilting one of said disks, said means located along one side of and partially within the periphery of such disk.

19. A crushing machine comprising a frame, two opposed rotating crushing disks inclined one to the other, a shaft upon which they are both supported and means independent of the rotation of said shaft for tilting one of said disks.

20. A crushing machine comprising a frame, two opposed rotating disks inclined one to the other, a single shaft upon which they are both supported, the outer rigid therewith and the inner loose thereon and means for tilting the inner disk.

21. In a pulverizing mill, the combination of a rotatable shaft; a muller-operating plate rotated by said shaft and having its functional face inclined to its axis of rotation; a free crushing muller independent of said shaft and plate and against the back of which the inclined face of said rotatable plate acts; and a crushing wall opposing the crushing face of the muller.

22. In a pulverizing mill, the combination of a rotatable shaft; a muller-operating plate rotated by said shaft and having its functional face inclined to its axis of rotation; a free crushing muller independent of said shaft and plate; an anti-friction free bearing between the inclined face of the plate and the back of the muller; and a crushing wall opposing the crushing face of the muller.

Signed at Milwaukee, Wisconsin, this 5th day of October 1911.

JOSIAH E. SYMONS.

Witnesses:
F. A. OTTO,
FLORA REINHOLD.